June 26, 1934.  J. E. HOOPER  1,964,202

METHOD OF MAKING A SELF LUBRICATING BEARING

Filed Nov. 30, 1931   2 Sheets-Sheet 1

Inventor
James E. Hooper
By Edwin F. Samuels
Attorney

June 26, 1934. J. E. HOOPER 1,964,202
METHOD OF MAKING A SELF LUBRICATING BEARING
Filed Nov. 30, 1931 2 Sheets-Sheet 2
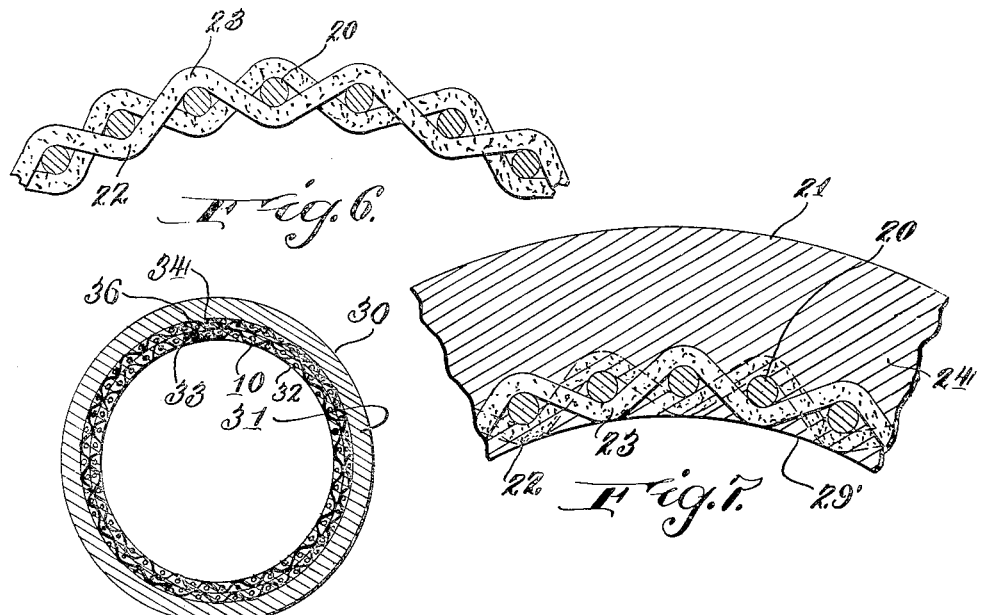
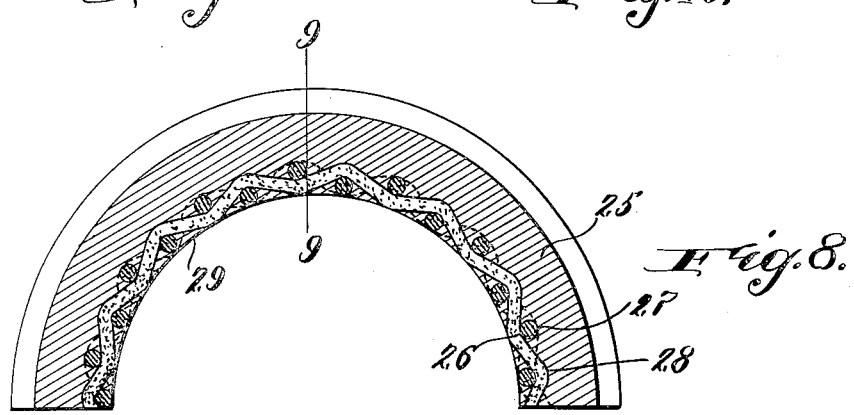
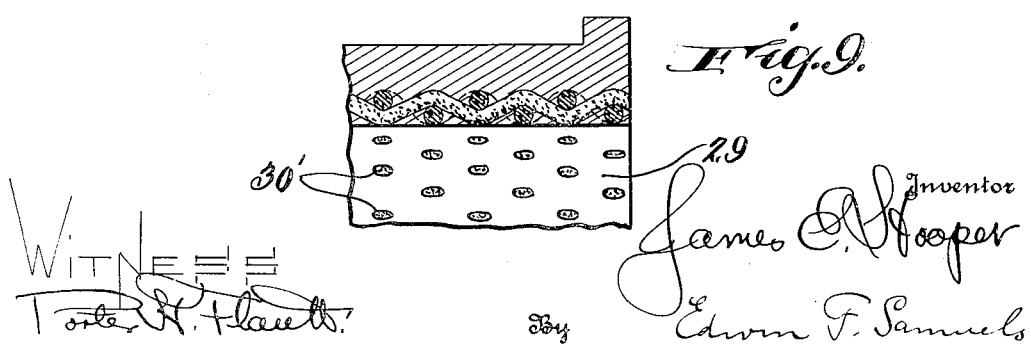

Patented June 26, 1934

1,964,202

UNITED STATES PATENT OFFICE 1,964,202

METHOD OF MAKING A SELF-LUBRICATING BEARING

James E. Hooper, Ruxton, Md., assignor to Wm. E. Hooper & Sons Co., Baltimore, Md., a corporation of Maryland Application November 30, 1931, Serial No. 578,024

1 Claim. (Cl. 18—55)

The manufacture of self lubricating bearings of bakelite, graphite and other components is well known. Where these bearings are used in connection with heavy machinery or in other instances where there is a heavy bearing pressure or lateral thrust, there is a tendency on the part of the bearings to crack and yield to the lateral stresses applied to the shaft. Various attempts have been made to overcome this difficulty as by the use of asbestos fabric, to which lubricating compound is applied before or during weaving. In some instances bakelite or a similar compound is combined with fabric by molding. However, the mineral fibers, as asbestos, are lacking in tensile strength and the bakelite and some other compounds used have proved to be lacking in the requisite adhesive properties to produce a satisfactory bearing when combined by molding with any of the various fabrics which have been tested in this connection.

In the effort to overcome this difficulty, the inventor has developed a method of making a bearing of fabric and molded hydrocarbon as bakelite whereby the lack of adhesive properties of the bakelite or similar compound is remedied and overcome. By this method the inventor has produced a self lubricating bearing, the bearing surface of which is reinforced by the textile fabric, the latter being impregnated with bakelite and another lubricating substance, namely, graphite or the like. This lubricating substance not only contributes to the result by the addition of its lubricating properties to those of the bakelite but it also assists in the entrance of the bakelite into the fabric and between the fibers of the fabric and in the finished product it improves the adhesion of the bakelite to the fabric.

In accordance with the method of the invention, in the preferred form the yarn of which the fabric is to be woven or a portion of it, either the filling or the warp or both, is passed through a bath of volatile liquid which contains in suspension a large proportion of finely divided graphite or equivalent solid. The graphite is carried into the yarn and deposited between the fibers substantially throughout its cross section and the liquid being highly volatile, evaporates immediately, leaving the graphite deposited around and between the fibers of which the yarn is composed. The graphite may within the scope of the invention be applied dry in powdered form. The yarn thus treated is then woven into a suitable reinforcing fabric, or the fabric may be impregnated with the graphite liquid or with dry graphite powder after it is woven.

After weaving, the fabric is mounted on a mandrel, the fabric being in any desired number of thicknesses either in tubular form or wound about the mandrel. The latter is substantially the diameter of the shaft which is to be seated in the bearing. The reinforcing fabric is then placed in a mold having the external form of the finished bearing, the mold being closed, is then connected to a supply of liquid bakelite or the equivalent under extremely high pressure which immediately fills the mold, whereby the fabric is completely impregnated with bakelite. The previous complete impregnation of the yarn or fabric or a portion of the yarn with graphite causes the bakelite or equivalent plastic to enter between the fibers and to surround and adhere to them. The bakelite also completely encases and closes the fabric which in the preferred form immediately underlies the surface of the bearing which engages the shaft. The bakelite thus forms the main body of the bearing which is reinforced by the fabric and portions of the warp and/or filling may, in one form of the invention, be exposed at the bearing surface whereby the rotation of the shaft and the slight resulting wear causes portions of graphite or equivalent material from the fabric to be distributed over the surface serving in combination with the bakelite to present to the shaft a most effective self lubricating bearing surface.

In the accompanying drawings, I have illustrated my self lubricating bearing in various forms and stages of production including the operation of impregnating the yarn and the molding operation. I have also shown the bearing fragmentarily in some of the various forms which are included in the invention.

In the drawings:

Figure 6 shows a fragmentary section of the reinforcing fabric in cylindrical form in which the filling only is impregnated with graphite, the section being in a plane at right angles to the axis.

Figure 7 is a similar section of a completed bearing reinforced with the fabric of Figure 6.

Figure 8 is a fragmentary section at right angles to the axis of a completed bearing composed of fabric, both the warp and the filling of which are impregnated with graphite or the equivalent, the bearing being composed of molded bakelite or the equivalent in which the fabric is embedded in accordance with the invention. In this instance, portions of both the warp and the filling are exposed at the bearing surface.

Figure 9 is a section through the same on the line 9, 9 in Figure 8. This bearing is composed of two semicylindrical parts, one of which is shown.

Figure 10 is a section through a flat piece of fabric impregnated with graphite in accordance with the invention.

Figure 11 shows a bearing composed of bakelite in which the flat fabric is embedded in the bearing surface by rolling it about a mandrel.

Figure 1:
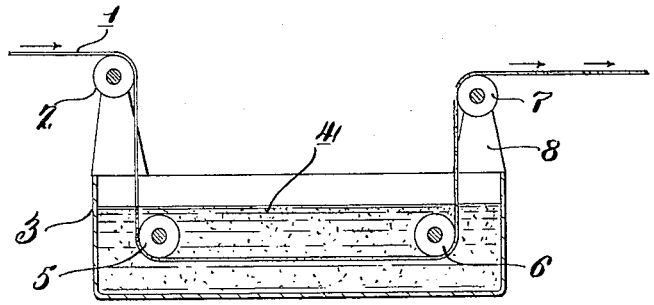
Figure 1 is a vertical longitudinal section showing more or less diagrammatically an apparatus for impregnating the yarn.

Referring to the drawings by numerals, each of which is used to indicate the same or similar parts in the different figures, the illustration, Figure 1, shows cotton or similar yarn 1 such as might be used in the manufacture of duck or this yarn may be of any suitable fiber. The yarn 1 is in the form of the invention shown led in a horizontal direction to a guide pulley 2 over which it is passed downwardly into a suitable receptacle or tank 3. This tank is shown as open at the top and containing a liquid 4 which may be any suitable volatile liquid as gasoline, varnoline, commercial ether or the like, in which finely powdered graphite is held in suspension. The mixture of liquid and graphite may to advantage have the consistency of a rather thin black paint.

The yarn in accordance with the illustration is carried from pulley 2 around a guide pulley 5 rotatively mounted on a suitable shaft beneath the surface of the liquid at one end, from which guide pulley it is shown as led forward in a horizontal direction to another guide pulley 6 from which it is led upwardly over still another guide pulley 7 supported above the tank on a suitable bracket 8. The yarn thus impregnated may be led to a circular loom not shown producing tubular or cylindrical fabric 9 as shown in Figures 2 and 3, or it may be woven into a flat fabric 10 as shown in Figure 10 and rolled as shown in Figure 11 and hereinafter described to produce a cylindrical bearing, and as previously implied, either the warp or the filling or both the warp and filling may be impregnated prior to weaving.

Figure 2:
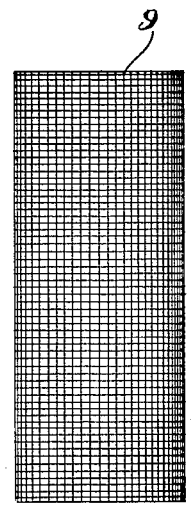
Figure 2 shows in plan the tubular fabric ready to be impregnated with bakelite.
Figure 3:
Figure 3 is an end elevation of the same.
Figure 5:
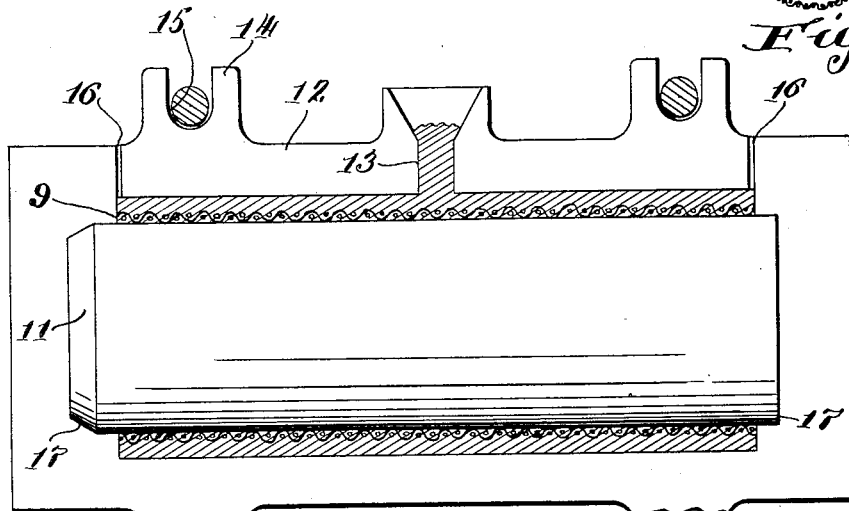
Figure 5 shows one half of the mold in which the fabric is impregnated with bakelite and the bearing is molded and produced in its final form, the bearing being shown in section on a plane of the axis and the mandrel being shown in plan.

Referring now to Figure 5, part or all of the yarn having been first impregnated and the fabric having been woven as illustrated in Figures 2 and 3, or Figure 10, it is either wound about the mandrel if it is a flat fabric or the mandrel is inserted in the tube if it is a tubular fabric, and the mandrel 11, Figure 5, with the fabric thereon indicated in this instance by reference character 9, is inserted in the mold 12, one side only of which is shown in Figure 5, and the mold being duly closed, the feed opening 13 thereof is connected to a source of bakelite solution or other similar or equivalent solution or fluid plastic under pressure. The mold is thus filled and the fabric impregnated, which, when the molded material is dried and hardened, produces a finished bearing of bakelite or similar hydrocarbon plastic which is reinforced by the fabric, the latter being completely impregnated with bakelite, it being understood in this connection that prior to molding, the volatile liquid or a large proportion of this liquid in which the impregnating graphite was suspended has evaporated providing for the free entrance of the bakelite between the fibers of the yarn as well as into the meshes between the yarn and into the mold.

The mold as illustrated is a cylindrical mold formed of two small cylindrical halves, the mold half being indicated by reference character 12 as aforesaid, is provided with ears 14 whereby the two mold halves may be connected together by means of any suitable fastenings as by bolts or other clamping means 15. This mold, as already pointed out, is provided with an inlet or feed opening 13 for the bakelite and with air vent openings 16 near each end of the mold cavity at the top. The mold as shown is also provided at each end with seats 17 to support and secure the ends of the mandrel 11.

Figure 4:
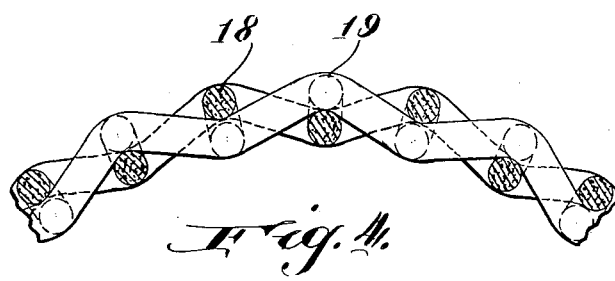
Figure 4 is a fragmentary section transverse to the axis showing one form of the fabric after it has been impregnated with graphite as to the warp only.

Referring to the various forms in which the fabric reinforce may be made, Figure 4 illustrates a fabric shown in cylindrical form of which the warp threads 18, which are parallel to the axis, are impregnated with graphite solution, the filling 19 being treated with bakelite only, the impregnation of the warp being regarded as sufficient to supply the additional lubricant and to hold the bakelite in position. It should be understood that the impregnation of the threads in this way with the graphite liquid adds not only to the lubricating properties, but particularly and most importantly assists in the impregnation of the yarn or threads with bakelite or other moldable material forming the body of the bearing and therefore greatly increases the effectiveness of the attachment of the fabric to the bakelite and vice versa. The graphite solution enters between and around the fibers and causes the bakelite to likewise enter between and to surround the individual fibers. This is a new accomplishment or result.

Figure 6 shows a reinforcing fabric ready for insertion in the mold and impregnation with bakelite. In the form of the fabric thus shown, the filling 23 is impregnated with graphite solution, the warp 20 being untreated. In the weaving of this fabric the warp threads are tightened during weaving so that there is a tendency to hold them in toward the center of the fabric and keep them from exposure at the surface of the bearing.

A completed bearing 21 in which the fabric 22, Figure 6, is embedded and in which it reinforces the bearing surface, is shown in Figure 7. As already pointed out, portions of the filling 23 may be exposed at the bearing surface 29, but the warp 20 is more deeply embedded in the bakelite 24.

Figure 11 shows a completed cylindrical bearing 30 of bakelite or equivalent material 31 in which bearing the bearing surface 32 is reinforced with flat fabric 10 rolled into cylindrical form most conveniently about the mandrel 11. Preferably, the fabric is of such length as to encircle the mandrel, bringing the ends 33 and 34 nearly opposite and bending the intervening portions of the fabric at 36 between said ends so as to make the reinforce continuous and of uniform thickness. The fabric may, however, be laid in any convenient manner to give the desired result, otherwise the process is similar to that previously described, Figures 8 and 9 show a completed semicircular bearing of bakelite 25 in which is embedded a layer of fabric 20 reinforcing the bearing surface. In this instance both the warp 27 and the filling 28 are impregnated with the graphite solution whereby the bakelite when introduced into the mold is caused to enter completely between the fibers of the yarn giving a complete interlocking of the bakelite with the fabric in the finished bearing. In this instance, both the warp and the filling may be more or less exposed at the bearing surface 29, said exposed portions of the warp and filling being indicated by reference character 30' in Figure 9. In this way, as already pointed out, the bearing surface which is largely of bakelite, or the equivalent, is supplied with more or less free graphite as the bearing becomes slightly worn and this graphite is distributed over the surface of the bakelite as the shaft rotates giving self lubrication in the most efficient form.

I have thus described specifically and in detail the method of making a self lubricating bearing in accordance with the invention and various forms of said bearing, in order that the manner of practicing the invention and operating, applying and using the same may be fully understood, however, the specific terms herein are used descriptively rather than in a limiting sense, the scope of the invention being defined in the claim.

What I claim as new and desire to secure by Letters Patent is:

The method of making a self lubricating bearing having a reinforcing member of fabric which comprises, first impregnating the yarn which is to compose the fabric with a graphite suspension, weaving the fabric from the impregnated yarn, evaporating the liquid portion of the suspension, placing the fabric in a mold in such a position that it will form the bearing surface, and filling the mold with carbonaceous plastic under pressure so that said plastic will form the body of the bearing and the fabric will be embedded in the plastic and form the bearing surface, the graphite facilitating the entrance of the plastic into the fabric and between the fibers of the yarn, thereby increasing the strength and durability of the bearing and increasing its lubricating properties.

JAMES E. HOOPER.